United States Patent
Ryan

(10) Patent No.: US 9,125,054 B2
(45) Date of Patent: Sep. 1, 2015

(54) CONFIGURABLE INTEGRATED RADIO PROCESSOR

(75) Inventor: Timothy Ryan, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 77 days.

(21) Appl. No.: 13/526,237

(22) Filed: Jun. 18, 2012

(65) Prior Publication Data

US 2013/0250865 A1 Sep. 26, 2013

Related U.S. Application Data

(60) Provisional application No. 61/615,017, filed on Mar. 23, 2012.

(51) Int. Cl.
*H04W 24/02* (2009.01)
*H04W 92/00* (2009.01)
*H04W 12/06* (2009.01)
*H04W 88/08* (2009.01)

(52) U.S. Cl.
CPC ............ *H04W 12/06* (2013.01); *H04W 88/085* (2013.01)

(58) Field of Classification Search
CPC ... H04W 28/04; H04W 72/04; H04W 72/042; H04W 88/08; H04L 5/0007
USPC ......................................................... 370/329
See application file for complete search history.

(56) References Cited

U.S. PATENT DOCUMENTS

| | | | |
|---|---|---|---|
| 5,483,538 A | | 1/1996 | Rainbolt |
| 5,608,734 A | * | 3/1997 | Sandler et al. ................. 370/509 |
| 6,124,895 A | * | 9/2000 | Fielder ........................... 348/515 |
| 6,292,484 B1 | * | 9/2001 | Oliver ............................ 370/389 |
| 2004/0240565 A1 | * | 12/2004 | Santhoff et al. ................ 375/259 |
| 2006/0146721 A1 | * | 7/2006 | Attar et al. ..................... 370/238 |

(Continued)

FOREIGN PATENT DOCUMENTS

| | | |
|---|---|---|
| CN | 101076173 A | 11/2007 |
| JP | 2011-254415 A | 12/2011 |

(Continued)

OTHER PUBLICATIONS

Korean Office Action directed to related Korean Patent Application No. 10-2013-0031060, mailed Mar. 27, 2014; 5 pages.

(Continued)

*Primary Examiner* — Charles C Jiang
*Assistant Examiner* — Thad Defauw
(74) *Attorney, Agent, or Firm* — Sterne, Kessler, Goldstein & Fox PLLC

(57) ABSTRACT

In a base station, a configurable radio unit allows for communication with a baseband processor that satisfies a CPRI standard while allowing personalization and customization by the end user in order to prevent undesired usage and/or access by other users/competitors. The radio module is programmable to allow for specific designation of the location, lengths, and types of signal and control information within CPRI basic frames. By being configured to allow for the adjustment of these parameters, the radio module can be commonly and mass produced while allowing for end users of the processors to personalize their use without additional hardware components, such as FPGA circuits. In addition, by generating a container frame, the radio module can allow for asynchronous communication between the CPRI standard and an employed communication scheme.

20 Claims, 9 Drawing Sheets

(56) References Cited

U.S. PATENT DOCUMENTS

| | | |
|---|---|---|
| 2007/0270185 A1 | 11/2007 | Yagawa |
| 2009/0180556 A1* | 7/2009 | Jang et al. ............... 375/240.29 |
| 2009/0239477 A1* | 9/2009 | Yamamoto ...................... 455/68 |
| 2011/0125936 A1 | 5/2011 | Malleth et al. |
| 2011/0182255 A1 | 7/2011 | Kim et al. |
| 2011/0280209 A1 | 11/2011 | Wegener et al. |
| 2013/0051329 A1* | 2/2013 | Take ............................ 370/328 |

FOREIGN PATENT DOCUMENTS

| | | |
|---|---|---|
| WO | WO 2011/152131 | * 12/2011 |
| WO | WO 2011152131 A1 | * 12/2011 |

OTHER PUBLICATIONS

English-Language Abstract for Japanes Patent Publication No. JP 2011-254415 A, published Dec. 15, 2011; 2 pages.

* cited by examiner

CONFIGURABLE INTEGRATED RADIO PROCESSOR

CROSS-REFERENCE TO RELATED APPLICATIONS

This patent application claims the benefit of U.S. Provisional Patent Application No. 61/615,017, filed Mar. 23, 2012, entitled "Configurable Integrated Radio Processor," which is incorporated herein by reference in its entirety.

BACKGROUND

1. Field of Invention

The disclosure relates to wireless communications, and more specifically to a configurable radio unit capable of being commonly manufactured and thereafter programmed to a customer's specifications.

2. Related Art

Wireless communication devices, such as cellular telephones to provide an example, are becoming commonplace in both personal and commercial settings. The wireless communication devices provide users with access to all kinds of information, as well as the ability to communicate with other such devices across large distances. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including: amplitude modulation (AM), frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

In many wireless communication environments, one of the first or second wireless communication device functions as a base station that provides communication between user devices and a central communication infrastructure. In such a base station a radio unit is typically positioned at a physically high point of a cellular tower for communication with user devices. However, a significant portion of signal processing actually takes place in a baseband processor located at a significant distance from the radio unit, e.g., in a bunker underground or in a nearby by communications facility.

In conventional base stations, the baseband module and the radio module communicate with one another under a Common Public Radio Interface (CPRI) or other interface. However, in many base stations, each service provider may have its own baseband processor which operates in a proprietary fashion so as to allow the service provider to monopolize its own equipment. In order to facilitate communication between the radio unit and the service provider's unique baseband processor, the service provider must therefore provide a FPGA (field-programmable gate array) or other programmable circuitry that converts information communications received by the radio unit into information that can be processed by its own baseband processor, and vice versa.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Figure 1:
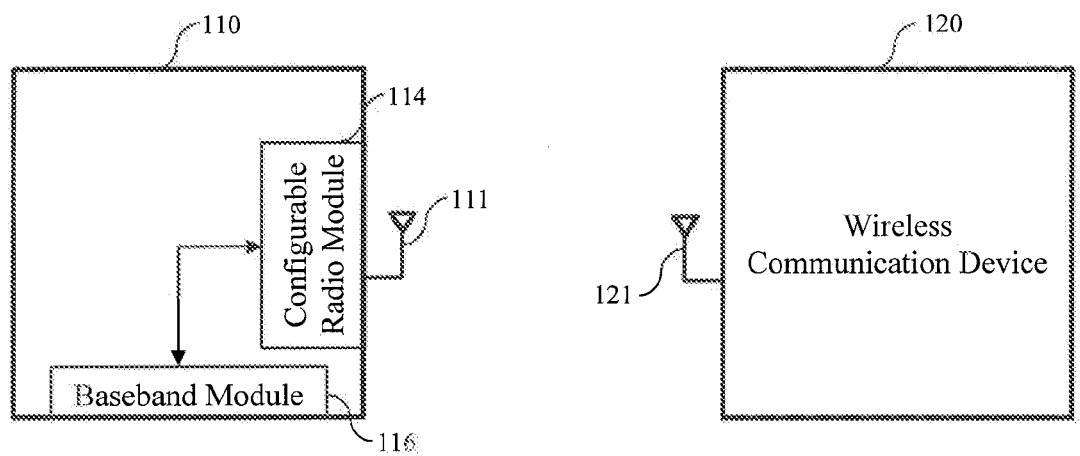
FIG. 1 illustrates a block diagram of an exemplary wireless communication environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the following description is to be described in terms of wireless communication (specifically cellular communication), those skilled in the relevant art(s) will recognize that this description may also be applicable to other communications that use wired, optical, or other wireless communication methods without departing from the spirit and scope of the present disclosure.

An Exemplary Wireless Communications Environment

FIG. 1 illustrates an exemplary block diagram of a wireless communication environment 100. The wireless communication environment 100 provides wireless communication of information, such as one or more commands and/or data, between wireless communication devices. The wireless communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

The exemplary wireless communication environment 100 includes a first wireless communication device 110 and a second wireless communication device 120. Each of the wireless transmitter 110 and the wireless receiver 120 may be included within corresponding wireless communication devices that are each capable of both wireless transmission and wireless reception. For purposes of this discussion, the first wireless communication device 110 may represent an exemplary embodiment of a base station, and the second wireless communication device 120 may represent an exemplary embodiment of a user equipment/subscriber station within a cellular communications network.

The base station may include a proprietary baseband module 116 and a configurable radio module 114. The baseband module 116 performs various signal processing functions on outgoing signals before forwarding those signals to the configurable radio module 114. As discussed above, conventional base stations require an additional FPGA for facilitating communication between a proprietary baseband module and a radio unit. In order to avoid requiring such an FPGA, the base station 110 includes the configurable radio module 114.

Based on its configuration, the radio module 114 is able to communicate with the proprietary baseband module 116 without an intervening FPGA. After receiving outgoing signals from the baseband module 116, the radio module 114 performs additional processing on the outgoing signals and transmits the signals to the wireless communication environment 100 via antenna 111. Those skilled in the relevant art(s) will recognize that the antenna 111 may include an integer array of antennas, and that the antenna 111 may be capable of both transmitting and receiving signals.

The second wireless communication device 120 receives the signals from the wireless communication environment 100 via its antenna 121. Again, those skilled in the relevant art(s) will recognize that the antenna 121 may include an integer array of antennas, and that the antenna 121 may be capable of both transmitting and receiving signals. The second wireless communication device 121 may respond by transmitting signals back to the base station 110, which the base station receives and processes the signals.

Detailed functionality of the base station and the configurable radio module 114 are discussed below with respect to the relevant figures.

Exemplary Configurable Radio Module

Figure 2:
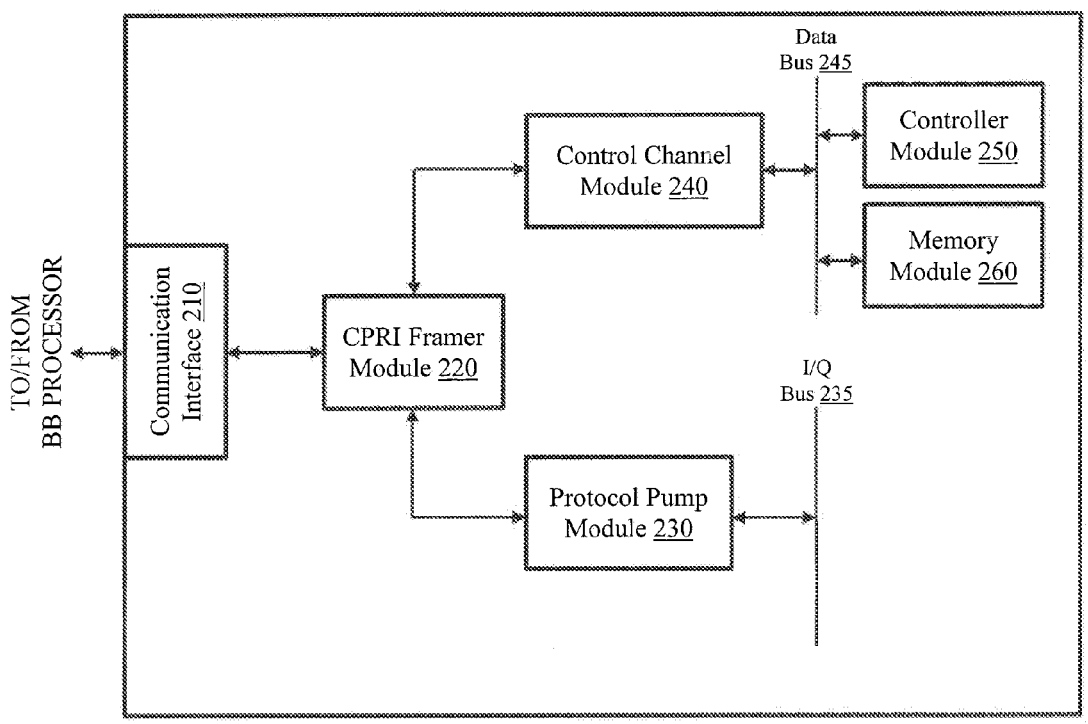
FIG. 2 illustrates a block diagram of an exemplary configurable radio module that may be implemented within the wireless communication environment.

FIG. 2 illustrates a block diagram of an exemplary configurable radio module 200 that may be implemented within the wireless communication environment. The radio module 200 includes a protocol pump module 230 and a control channel module 240, and may represent an exemplary embodiment of the configurable radio module 114. The radio module may include various other physical layer devices (e.g. amplifiers, mixers filters, digital/analog converters, etc.) to further provide signal processing as necessary for wireless signal transmission, as will be understood by these skilled in the art.

The following description of the configurable radio module 200 will be made with respect to the downstream communication direction, in which the radio module 200 receives information from the baseband module 116 for communication to the wireless communication environment 100. However, those skilled in the relevant art(s) will readily recognize that the following functions can be similarly performed in a reverse order for operation in an upstream communication direction, in which the radio module 200 provides information received from the communication environment 100 to the baseband processor 116.

The radio module 200 includes a controller module 250 and a memory module 260 that are capable of communicating with each other via a data bus 245. The memory module 250 may be configured to store various operational configurations that may be programmed by an end user of the radio module 200, including such instructions that allow the controller module 250 to control the various components of the radio module 200 to implement the proprietary communication and processing schemes. The controller module 250 may be capable of controlling one or more of the elements of the radio module 200 in order to implements these programmed communication and processing schemes.

The radio module 200 includes a communication interface 210 configured to send and receive data to/from the baseband module 116. The communication interface 210 may include necessary functionality to convert incoming/outgoing signals into proper transmission formats, such as one or more serializer/deserializers (SERDES). Upon receipt of the signals from the baseband module 116, the communication interface 210 forwards the received information to a CPRI framer module 220.

The CPRI framer module 220 identifies CPRI basic frames from within the received data stream and forwards the resulting basic frame data stream to each of a protocol pump module 230 and a control channel module 240. The protocol pump module 230 extracts in-phase (I) and quadrature (Q) signal information from the basic frame data stream, and forwards the extracted I/Q information to an I/Q bus 235 for further processing, such as digital up-conversion, digital down-conversion, and/or transmission to the wireless communication environment 100. The control channel module 240 extracts control channel information from the basic frame data stream and forwards this information to the data bus 245. The extracted control channel information can then be processed by the controller module 250 and/or information derived therefrom can be stored in the memory module 260.

1. Programmable Frame Length

When communicating with the baseband module 116, the CPRI standard dictates several standard line rates and frame lengths, including:

| Line Rate (Mbps) | Frame Length (bytes) |
|---|---|
| 614.4 | 16 |
| 1228.8 | 32 |
| 2457.6 | 64 |
| 3072.0 | 80 |
| 4915.2 | 128 |
| 6144.0 | 160 |
| 9830.4 | 256 |

However, many proprietary systems employ line rates and frame lengths that fall outside of this list of standardized values. Therefore, the CPRI framer module 220 of the configurable radio module 200 can be programmed to implement non-standard line rates/frame lengths. This can be performed by setting one or more data registers within the CPRI framer module 220, or by the controller module 250 controlling the CPRI framer module 220 in accordance with information stored in the memory module 260.

Using the programmed line rate/frame length, the CPRI framer module 220 generates a stream of CPRI basic frames containing the information received from the baseband module 116, which it then forwards to the protocol pump 230 and the control channel module 240 for further processing.

2. Protocol Pump Module

Figure 3:
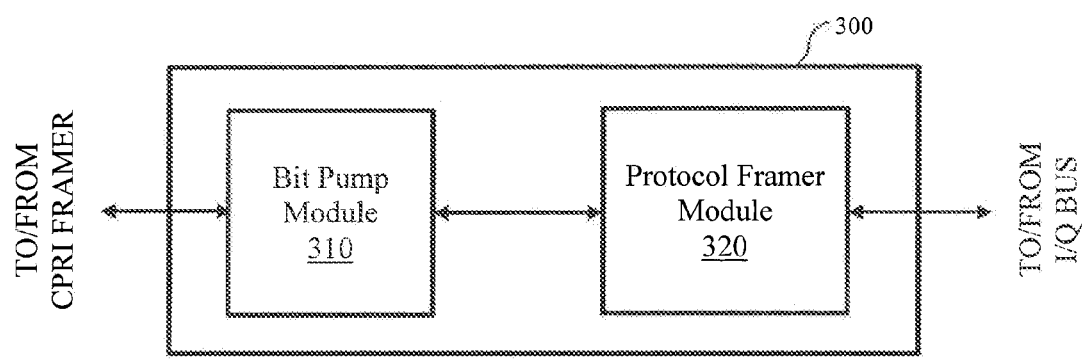
FIG. 3 illustrates a block diagram of an exemplary protocol pump module that may be implemented within the configurable radio module.
Figure 4:
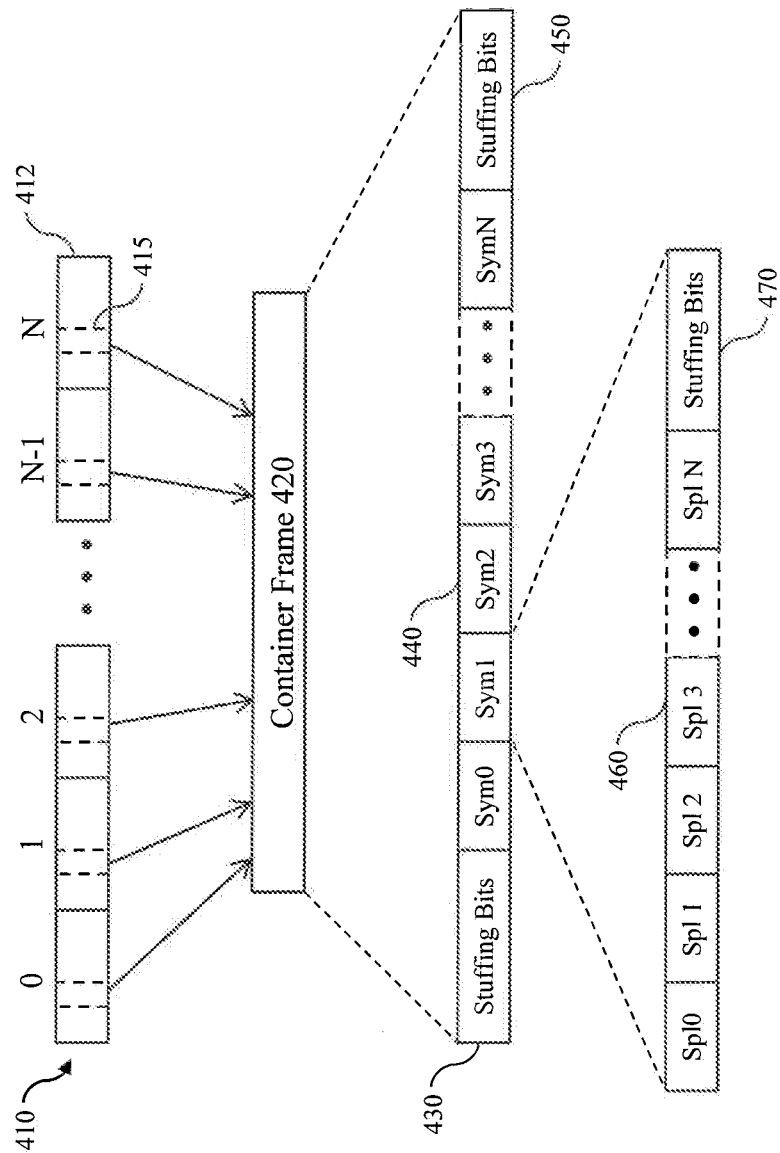
FIG. 4 illustrates an exemplary container frame construction/dissection.

FIG. 3 illustrates a block diagram of an exemplary protocol pump module 300 that may be implemented within the configurable radio module 200. The protocol pump module 300 includes a bit pump module 310 and a protocol framer module 320, and may represent an exemplary embodiment of the protocol pump module 230. FIG. 4 illustrates an exemplary container frame construction/dissection, and will be used to describe the functionality of protocol pump module 300.

The protocol pump module 300 receives a stream of CPRI basic frames 410 from the CPRI framer module 220. The CPRI basic frame stream 410 includes a plurality of CPRI basic frames 412. The bit pump module 310 extracts from each of the CPRI basic frames 412 a contiguous number of bits 415 to generate a virtual datastream. Conventionally, this contiguous number of bits is predefined in both location and length by CPRI basic frame standards. However, the bit pump module 310 can be programmed in accordance with an end user's design intentions, which provides significant customization.

For example, in a conventional system, the bit pump may be required to extract 12 contiguous bits beginning at bit 32 of each CPRI basic frame, which obviously does not permit customization and/or personalization, and consequently does not assist in making the chip proprietary. By allowing the bit pump module 310 to be programmable, the CPRI basic frames can be constructed in virtually any manner, such that bit layouts within those basic frames can be customized. For example, the bit pump module 310 may be programmed with a starting bit as well as a length. The bit pump module 310 will then extract a contiguous number of bits from each basic frame 412 equal to the length, beginning with the starting bit.

As the bit pump module 310 extracts the designated bit sequences 415 from the CPRI basic frames 412, the bit pump module 310 forwards the extracted bit sequences 415 to the protocol framer module 320. The protocol framer module 320 receives the fixed bandwidth data stream from the bit pump module 310 and extracts from the data stream I/Q sample data to be supplied to the I/Q bus 235.

A. Simple Extraction

The CPRI standard defines the frequency of the CPRI basic frame rate as 3.84 MHz. Several communication schemes currently in use employ some integer multiple of that frequency, which makes extracting the I/Q samples relatively straightforward.

In a simplest example, a communication scheme may employ 3.84 MHz, meaning that there is one I/Q sample in each of the CPRI basic frames 412. If each sample consists of 16 bits of data, the protocol framer module 320 merely receives 32 bits of data from each CPRI basic frame 412 (16 for the I sample and 16 for the Q sample) and forwards these bits to the I/Q bus 235. In another example, a communication scheme employing twice the CPRI standard frequency of 3.84 MHz will have two I/Q samples in each CPRI basic frame 412. In this instance, the protocol framer module 320 receives 64 bits (corresponding to the bits of 2 I samples and 2 Q samples) of information for forwarding. Even in this simple case, the sample size may be programmable. For example, although there may be two samples per basic frame, the user may configure the sample to be a specific number of bits other than 16.

B. Container Frame

In many instances, however, the communication scheme being employed will not use a sample rate that is an integer multiple of the 3.84 MHz defined by the CPRI standard (e.g., WIMAX, CDMA, GSM, etc.). When the frequency of the communication scheme is not an integer multiple of 3.84 MHz, the sampling rate of the communication scheme will be such that there are not integer numbers of I/Q samples in each CPRI basic frame 412. In order to reconcile the differing frequencies, the protocol framer module 320 generates a container frame 420, as follows.

in order to ensure that the protocol framer module 320 processes an integer number of I and Q samples, the protocol framer module 320 calculates or receives a least common multiple $N_{sample}$ of the sample rate of the communication scheme and that of the CPRI standard. This least common multiple $N_{sample}$ may be large, for example, on the scale of 50,000-60,000. The least common multiple $N_{sample}$ corresponds to the length of the container frame 420, in numbers of CPRI basic frames 412. For example, the least common multiple can be calculated as follows:

$$T_{CPRI} = 1/3.84 \text{ MHz}, \quad (1)$$

$$T_{protocol} = 1/f_{sample\_rate}, \quad (2)$$

$$T_{LCM} = LCM(T_{CPRI}, T_{protocol}), \text{ and} \quad (3)$$

$$N_{sample} = T_{LCM}/T_{protocol}, \quad (4)$$

where $T_{CPRI}$ is the CPRI sampling period, $T_{protocols}$ is the protocol sampling period and $T^{LCM}$ is the least common multiple of those periods.

Now that the length of the container frame 420 has been determined, the protocol framer module 320 can determine how many communication scheme samples will fit within the container frame 420, and divide the result back into the number of basic frames to determine the size of the bit sequences 415 ($N_{bits\_per\_frame}$) that need to be extracted by the bit pump module 310 from each of the CPRI basic frames 412. For example, the number of bits per frame can be calculated as follows:

$$N_{basic} = T_{LCM}/T_{CPRI}, \quad (5)$$

$$N_{bits} = N_{sample} * \text{bits\_per\_protocol\_sample}, \quad (6)$$

$$N_{bits\_per\_sample} = \lceil N_{bits}/N_{basic} \rceil, \quad (7)$$

where $N_{basic}$ is the number of basic frames and $N_{bits}$ is the total number of bits calculated for extraction.

In an example, the protocol framer module 320 determines, after the above calculations have been performed, that 1.8 bits from each CPRI basic frame 412 are needed to fill the container frame 420. Because the protocol framer module 320 can not allocate partial bits in the container frame, the protocol framer module 320 instead allocates the ceiling of the calculated number of bits ($\lceil 1.8 \rceil = 2$ in the example) per CPRI basic frame 412. Consequently, the container frame 420 will often have a size greater than the number of bits needed for the communication scheme protocol.

In order to accommodate for this extra space, when constructing the container frame 420 from the extracted bit sequences 415, the protocol framer module 320 adds stuffing bits. In other words, stuffing bits may be needed when:

$$N_{container\_bits} \geq N_{bits}, \text{ where} \quad (8)$$

$$N_{container\_bits} = N_{bits\_per\_frame} * N_{basic}, \quad (9)$$

For example, as shown in FIG. 4, the protocol framer module 320 may add leading stuffing bits 430 and trailing stuffing bits 450 that bookend a plurality of symbols 440 constructed from the extracted bit sequences 415. In addition, within each symbol 440, in addition to a plurality of I/Q samples 460, the protocol framer module 320 may also add symbol staffing bits 470 to assist in minimizing required buffer space and reduce system delay.

Using the above configurations provides end users with significant available customizations. For example, the amount of leading stuffing bits 430 and the amount of trailing stuffing bits 450 can each be defined. In addition, the stuffing bits can be made to include "hidden" information for use by other components within the base station 110. Further, formats of the symbols 440 contained within the container frame 420 can be customized.

Figure 5:
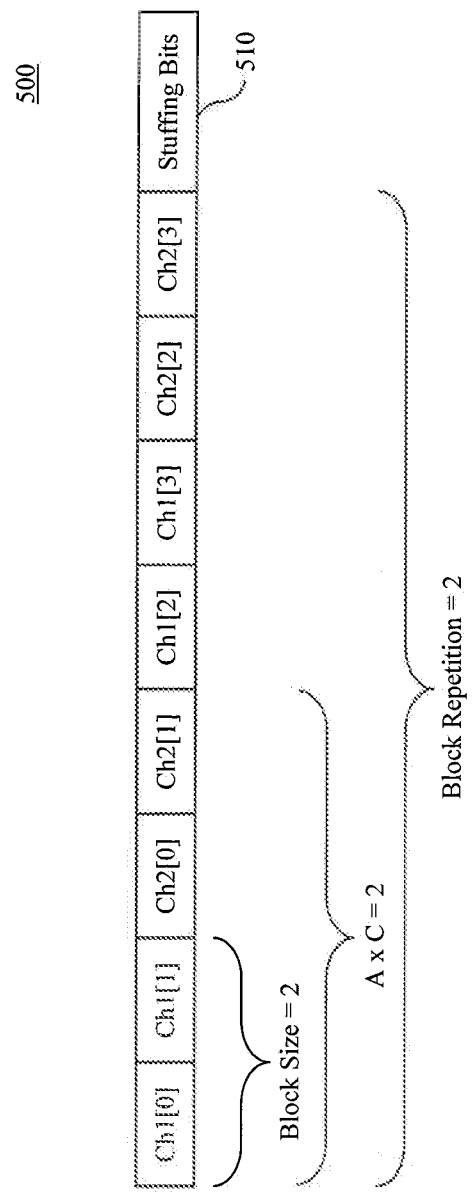
FIG. 5 illustrates an exemplary symbol that may be included within the container frame.

FIG. 5 illustrates an exemplary symbol 500 as an example of symbol 440 that may be included within the container frame 420. As part of the available customizations, a user may define a block size, an AxC size, and a block repetition that make up each of the symbols, as well as a size of the symbol stuffing bits 510.

The CPRI standard defines AxC as a number of antennacarriers (one antennacarrier is the I/Q data for one carrier on one antenna). The symbol 500 has an AxC Group of size 2, as it includes data designated for a first antenna carrier ch1 and a second antenna carrier ch2. The block size identifies the number of contiguous samples designated for a single one of the antenna carriers. The symbol 500 has a block size of 2, and therefore contains blocks of two contiguous samples for each of the two antenna channels (e.g., ch1[0] and ch1[1], ch2[0] and ch2[1], etc.). Finally, the block repetition can be configured to define the number of times blocks for a single channel are contained within the symbol. The symbol 500 has a block repetition equal to 2, and therefore includes two channel 1 blocks and two channel 2 blocks (e.g., ch1[0]/ch1[1] and ch1[2]/ch1[3] channel 1 blocks, etc.). In this manner, significant customization is available for the user.

Assembling container frames in this manner provides significant advantages. For example, as previously mentioned, placing stuffing bits in each of the symbols reduces required buffering and system delay. In particular, unlike packet-based communications that are able to send information only when packets are available for sending, CPRI employs time-division multiplexing which requires information to be sent during each time slot designated for transmission. Consequently, if stuffing bits are provided only at the beginning or end of the container frame 420, an extremely large buffer would be needed to store a large enough number of information bits to ensure that information bits are actually present during a designated time slot. This also correspondingly raises system delay. However, by adding stuffing bits to each symbol, the stuffing bits can be spread throughout the container frame, which substantially reduces the amount of buffering required. In addition, by placing multiple carriers within each symbol, those carriers can share the symbol stuffing bits, which even further reduces buffering.

3. Clock Slipping

In some scenarios, particularly when the communication scheme frequency is not an integer multiple of the CPRI standard frequency and/or when the sample rate clock of a sample stream is not locked to the same reference as the CPRI clock, clock slipping may occur. Specifically, although the size of the container frame has been previously calculated based on the expected frequencies of the CPRI and the communication protocol, the actual frequencies may drift away from their expected values in certain situations, which alters the boundaries from those calculated. Because CPRI operates in TDM, slipping can cause significant problems because it would require an essentially infinite buffer to ensure that overflow (e.g., if the communication protocol is running faster) or underflow (e.g., if the communication protocol is running slow) does not occur.

In order to counteract the clock slipping, and to reduce buffering requirements, the protocol framer module 320 can add one or more frames to, or drop one or more frames from, a particular container frame 420. It should be noted, that slippage can generally be corrected by adding or dropping only a single CPRI frame from a particular container frame 420, especially when performed among multiple container frames.

Referring to FIG. 4, an example of clock slipping compensation is provided. If the communication scheme (e.g., GSM) is running slower than expected, the protocol framer module 320 can extend the length of the container frame 420 by including the bits of CPRI basic frame N twice. Conversely, if the communication scheme is running faster than expected, the protocol framer module 320 can shorten the length of the container frame 420 by ending the container frame 420 at CPRI basic frame N-1 and starting the next container frame early.

As the above descriptions relate to the configurations of the configurable radio unit 200, it is necessary to identify the changes in the sizes of different container frames 420 to the baseband module 116 for proper container frame dissection. In an embodiment, the protocol framer module 320 can include an instruction for the baseband module 116 as part of the stuffing bits (e.g., the leading staffing bits 430). In this manner, upon receipt of a particular container frame 420, the baseband module 116 can analyze the stuffing bits to determine whether the corresponding container frame has been extended or shortened. In another embodiment, the configurable radio unit 200 can explicitly communicate over the control channel as to whether frames are to be added or dropped.

3. Control Channel Module

Figure 6:
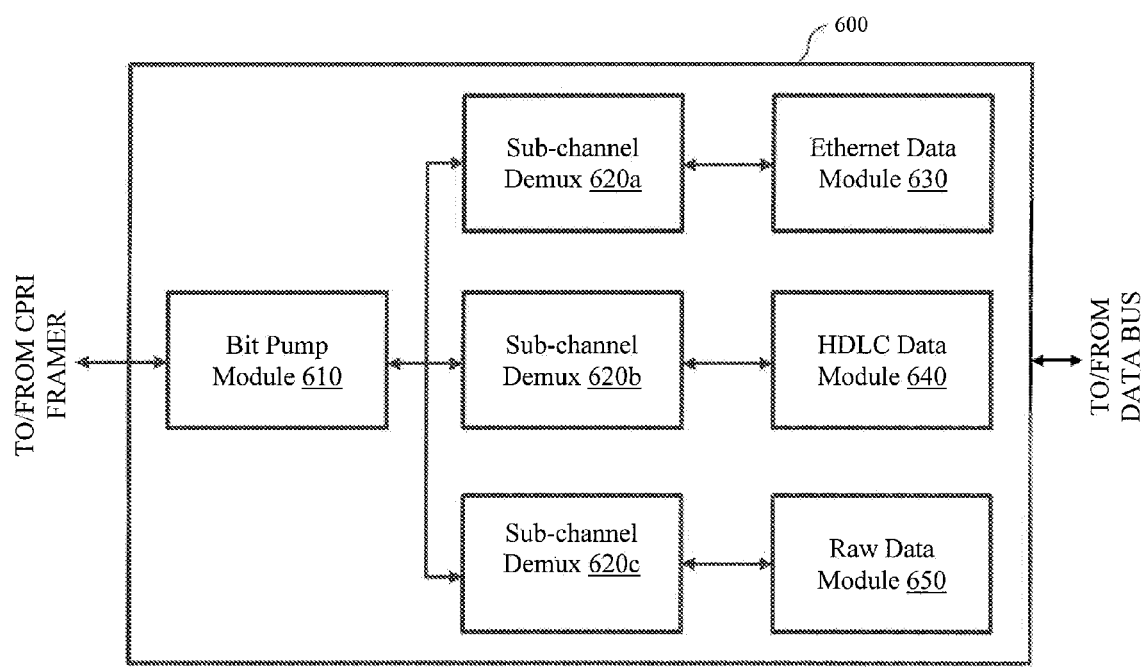
FIG. 6 illustrates a block diagram of an exemplary control channel module that may be implemented within the configurable radio module.

FIG. 6 illustrates a block diagram of an exemplary control channel module 600 that may be implemented within the configurable radio module 200. The control channel module 600 includes a bit pump module 610, a plurality of sub-channel demultiplexers 620 and a corresponding plurality of data modules 630-650 for different types of data, and may represent an exemplary embodiment of the control channel module 240.

The bit pump module 610 acts as a second bit pump to the bit pump module 310 of the protocol pump module 300 and extracts a second grouping of bits from each of the CPRI basic frames 412 received from the CPRI framer module 220. As with the bit pump module 310, the user can program the bit pump module 610 to extract a particular location and number of bits from each of the CPRI basic frames 412 in accordance with the user's own control channel specifications. These extracted bits are then processed by the control channel module 600 as the control channel.

The CPRI standard defines a control channel structure using a Hyper Frame construct. Every CPRI basic frame 412 contains a control word that forms part of the Hyper Frame. The bit pump module 610 extracts the bits corresponding to the control word from each of the CPRI basic frames 412. The position and length of the these control words within each of the CPRI basic frames 412 may be set by the user, and the bit pump module 610 can be configured accordingly to extract the proper bits that correspond to the control word.

Figure 7:
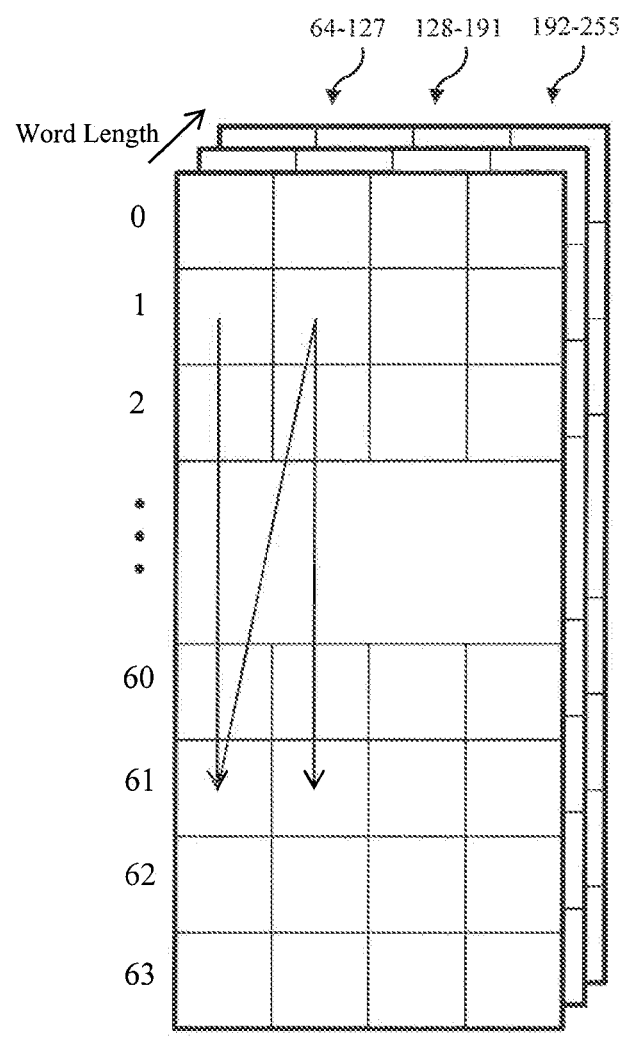
FIG. 7 illustrates an exemplary control channel frame that may be processed by the control channel module.

FIG. 7 illustrates an exemplary control channel frame that may be processed by the control channel module 600, and which may represent an exemplary Hyper Frame. As shown in FIG. 7, the control channel frame includes an array of 256 control words, typically having dimensions of 64 rows by 4 columns. It should be noted, however, that the dimension of the control channel frame can be modified and also set to a value other than 256 as part of a user's configuration. The array has a depth equal to a word length of the control words being extracted from the CPRI basic frames 412.

In the control channel frame, the first column includes control words 0-63 extracted by the bit pump module 610, the second column includes the next 64 words (words 64-127), the third column includes words 121-191, and the fourth column includes words 192-255.

Although the locations of some control information is required by the CPRI standard, the locations of several other pieces of different control information can be defined within this control channel frame. For example, control words 19-60 can be designated by a user for Ethernet control information. As the control words are being extracted from the corresponding CPRI basic frames 412, the sub-channel demultiplexer 620 directs those control words to their designated destinations. In the above example, the sub-channel demultiplexer 620*a* routes control words 19-60 to the Ethernet Data module 630 for further processing. Similar sub-channel demultiplexers 620*b* and 620*c* route the control words corresponding to HDLC data and Raw data to the HDLC data module 640 and the Raw data module 650, respectively.

It should be noted that the sub-channel demultiplexers 620*a*-620*c* can constitute a single demultiplexer that routes all incoming control words to their designated destinations. It should also be noted that there may be more types of data modules for processing other types of control data, or there may be fewer data modules, as desired.

By allowing the locations of the various control channel information to be uniquely configured, significant customization can be provided to the end user of the configurable radio module 200.

Reverse Communication

As previously mentioned, the above discussion has been made with respect to downstream communication, in which the CPRI signals are being received by the configurable receiver module 114 from the baseband module 116. However, the configurable radio module 300 can perform similar (but reversed) processes to those discussed above for sending information to the baseband module 116.

For example, the protocol pump module 230 can receive I/Q data from the I/Q bus 235 and generate the container frame from the different channels of received I/Q data in a substantially reversed manner from that shown in FIG. 4. The container frame 420 can then be provided to the CPRI framer module 220 to generate the CPRI basic frame stream 410.

Similarly, the control channel module 240 can receive information from the data bus 245 and/or the various data modules 630-650, and reconstruct the control channel frame therefrom. The control channel frame can then be supplied to the CPRI framer module 220 to generate the CPRI basic frame stream 410.

Having received the necessary information from the protocol pump module 230 and the control channel module 240, the CPRI framer module 220 can generate the CPRI basic frame stream 410 for transmission to the baseband module 116. The baseband module 116 can have a configuration similar to the configuration of the configurable receiver module 114 in order to properly receive, dissect, and process the CPRI basic frame stream 410. In this manner, proprietary CPRI communication can be performed in both an upstream and a downstream direction in both the configurable receiver module 114 and the baseband module 116.

Exemplary Method of Deciphering CPRI Information

Figure 8:
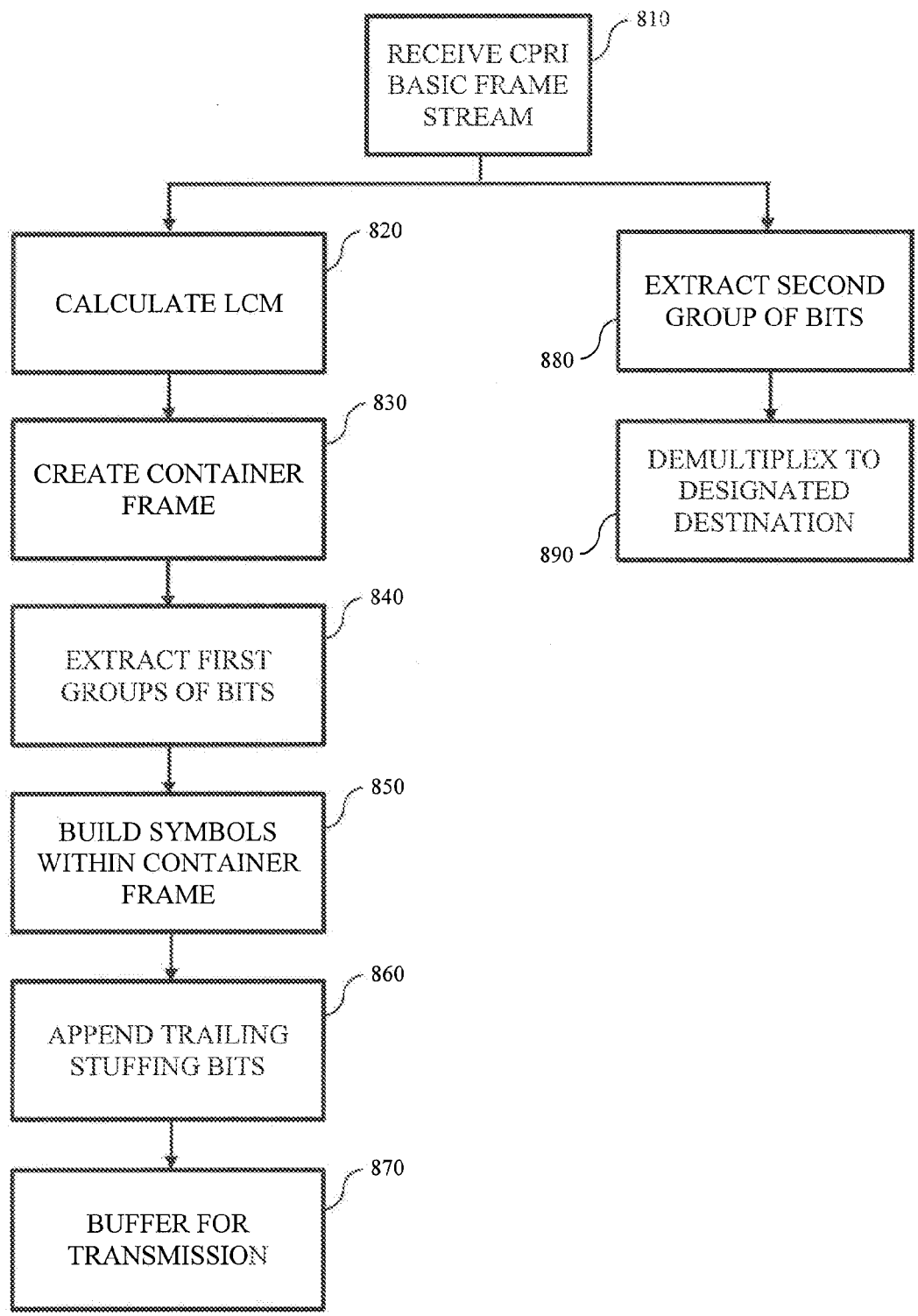
FIG. 8 illustrates an exemplary method for extracting signal and control data from a CPRI signal.

FIG. 8 illustrates an exemplary method for extracting signal and control data from a CPRI signal in a radio module. In the method, a CPRI basic frame stream is received 810 by the radio module. The radio module calculates a least common multiple between the CPRI frequency of 3.84 MHz and a frequency of a current communication scheme 820. The radio module then creates a container frame based on the calculated least common multiple 830 that includes a number of leading stuffing bits. It should be noted that these stuffing bits can be generated to include instruction and/or other signals.

From the least common multiple, radio module is able to determine how many bits from each of the CPRI basic frames must be extracted, and extracts a contiguous group of bits equal to this number from each of consecutive CPRI basic frames 840. Using these bits, the radio module builds symbols of I and Q information within the container frame 850. Each symbol may include I/Q data for one or more channels and may include symbol stuffing bits. Once the container frame has been filled with the extracted bits, trailing stuffing bits are appended in order to complete the container frame 860. This container frame is then buffered for transmission 870.

At the same time as the above, a second group of contiguous bits can be extracted from each of the CPRI basic frames of the CPRI basic frame stream corresponding to control channel information 880. These extracted bits can correspond to a control channel frame. By being configured with the specific location of various data within the control channel frame, this data can be demultiplexed by the radio module to provide various pieces of the control information to corresponding designated destinations for farther processing 890.

Those skilled in the relevant art(s) will recognize that the above method can additionally or alternatively include any of the functionality of the configurable radio module 300 discussed above, as well as any of its modifications. Further, the above description of the exemplary method should neither be construed to limit the method nor the description of the configurable radio module 300.

Exemplary Method of Compensating for Clock Slipping

Figure 9:
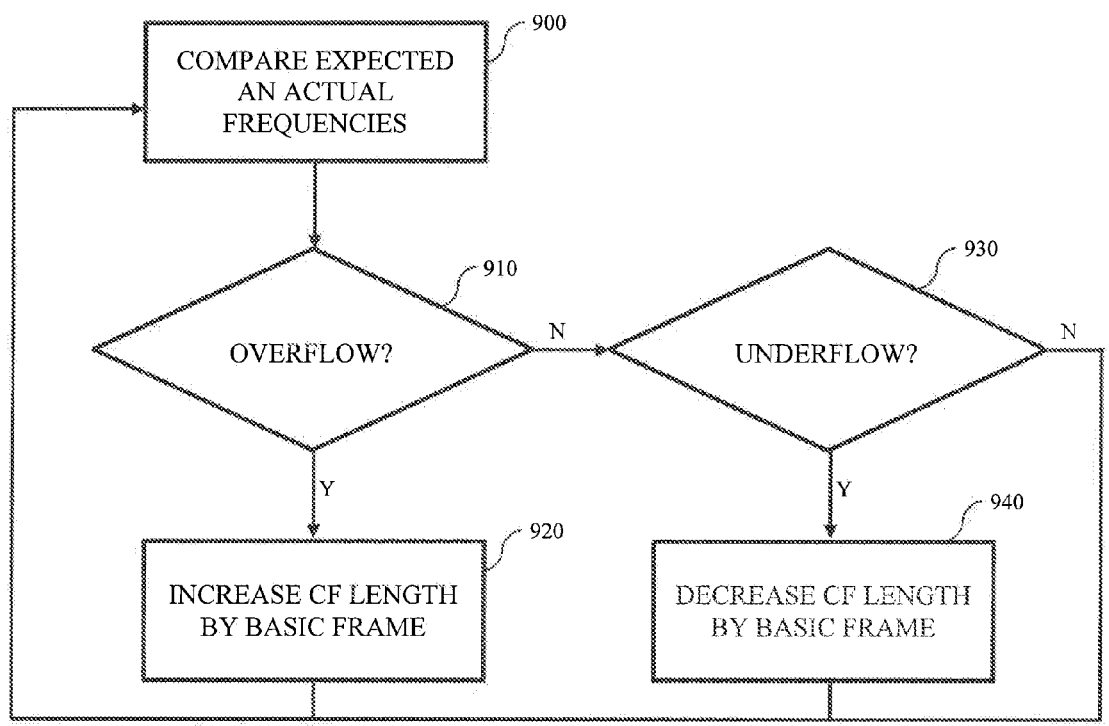
FIG. 9 illustrates an exemplary method for compensating for clock slipping.

FIG. 9 illustrates an exemplary method for compensating for clock slipping in a radio module. As discussed above, there may be some scenarios in which the communication scheme clock and/or the CPRI clock will drift apart from one another. In such circumstances, the actual clock speeds of the CPRI and communication schemes are compared to expected values 900.

If the comparison indicates an overflow scenario (e.g., the communication scheme clock is running slower than expected and/or the CPRI clock is running faster than expected) 910Y, the length of a container frame can be increased by one or more CPRI basic frames 920. If, on the other hand 910N, the comparison indicates an underflow scenario (e.g., the communication scheme clock is running faster than expected and/or the CPRI clock is running slower than expected) 930Y, the length of a container frame can be decreased by one or more CPRI basic frames 940.

Once the container frame length has been adjusted, or if the comparison indicates neither an overflow or underflow scenario 930N, the expected and actual values frequencies are again compared 900 in order to continuously monitor possible clock slipping.

Those skilled in the relevant art(s) will recognize that the above method can additionally or alternatively include any of the functionality of the configurable radio module 300 discussed above, as well as any of its modifications. Further, the above description of the exemplary method should neither be construed to limit the method nor the description of the configurable radio module 300.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may he defined so long as the specified functions and relationships thereof are appropriately performed.

It will be apparent to those skilled in the relevant art(s) that various changes in form and detail can he made therein without departing from the spirit and scope of the disclosure. Thus, the invention should not be limited by any of the above-described exemplary embodiments, but should be defined only in accordance with the following claims and their equivalents.

What is claimed is:

1. A configurable radio unit capable of receiving information from a baseband processor via a common public radio interface (CPRI) standard, the radio unit comprising:
a memory that stores a user-defined first subset of contiguous bits, a user-defined second subset of contiguous bits, and at least one of a user-defined line rate and a user-defined frame length; and
one or more processors and/or circuits, including:
a CPRI framer module configured to generate, from the information received from the baseband processor, a stream of CPRI basic frames based on the at least one of the user-defined line rate and the user-defined frame length;
a protocol pump module configured to extract the user-defined first subset of contiguous bits from consecutive CPRI basic frames of the CPRI basic frame stream corresponding to quadrature signal information; and
a control channel module configured to extract the user-defined second subset of contiguous bits from the consecutive CPRI basic frames of the CPRI basic frame stream corresponding to control channel information.

2. The configurable radio unit of claim 1, wherein the CPRI framer module is configured to operate at the user-defined line rate other than a standard line rate defined by the CPRI standard, and
wherein the CPRI framer module is configured to operate at the user-defined frame length other than a standard frame length defined by the CPRI standard.

3. The configurable radio unit of claim 1, the protocol pump module including:
a bit pump module configured to extract the user-defined first subset of contiguous bits; and
a protocol framer module configured to organize the extracted first subset of contiguous bits as in-phase and quadrature samples of a quadrature data signal.

4. The configurable radio unit of claim 3, wherein the bit pump module is configured to be programmed with a starting bit and a length for defining the user-defined first subset of contiguous bits, and wherein the bit pump module is configured to extract the first subset of contiguous bits from each of the CPRI basic frames beginning at the programmed starting bit and having a number of bits equal to the programmed length.

5. The configurable radio unit of claim 4, wherein the bit pump module generates, by extracting the first subset of contiguous bits from each of consecutive CPRI basic frames, a constant bandwidth serial data stream.

6. The configurable radio unit of claim 3, wherein the protocol framer module is configured to, when the radio unit employs a communication scheme that operates at a sample rate that is an integer multiple of a basic frame rate of the CPRI basic frame stream, cause the bit pump module to extract an integer number of the in-phase and the quadrature samples from each of the consecutive CPRI basic frames.

7. The configurable radio unit of claim 6, wherein the protocol framer module is configured to, when the radio unit employs a communication scheme that operates at a sample rate that is not an integer multiple of the basic frame rate of the CPRI basic frame stream, generate a container frame for organizing an integer multiple of the in-phase and the quadrature samples based on the first subset of contiguous bits extracted by the bit pump module.

8. The configurable radio unit of claim 1, the control channel module including:
a bit pump module configured to extract the user-defined second subset of contiguous bits from consecutive CPRI basic frames as control channel information of a virtual control channel frame;
a plurality of data modules configured to process various groups of information contained within the virtual control channel frame; and
a sub-channel demultiplexer configured to be programmable with locations of the various groups of information within the virtual control channel frame, and to direct the various groups of information as they are received from the bit pump module to corresponding ones of the plurality of data modules.

9. A configurable radio unit capable of receiving information from a baseband processor via a common public radio interface (CPRI) standard using a selected communication scheme and processing the received information for transmission to a wireless communication environment, the radio unit comprising:
one or more processors and/or circuits, comprising:
a CPRI framer module configured to generate, from the information received from the baseband processor, a stream of CPRI basic frames having a standard CPRI basic frame rate; and
a protocol pump module configured to extract a subset of contiguous bits from consecutive CPRI basic frames of the CPRI basic frame stream representative of quadrature signal information,
wherein the selected communication scheme employs a sample rate that is not an integer multiple of the standard CPRI basic frame rate.

10. The configurable radio unit of claim 9, the protocol pump comprising:
a protocol framer module configured to generate a container frame for organizing an integer number of in-phase and quadrature samples of the quadrature signal information and identifying a number of bits to be extracted from each CPRI basic frame of the CPRI basic frame stream; and
a bit pump module configured to extract a number of bits from each CPRI basic frame equal to a ceiling of the number of bits.

11. The configurable radio unit of claim 10, wherein the protocol framer module is configured to generate the container frame by determining a least common multiple of the communication scheme sample rate and the CPRI basic frame rate, sizing the container frame based on the determined least common multiple, and organizing the extracted subsets of contiguous bits into a plurality of in-phase/quadrature symbols.

12. The configurable radio unit of claim 11, wherein the protocol framer module generates the container frame to have a plurality of leading stuffing bits and a plurality of trailing stuffing bits that bookend the plurality of in-phase/quadrature symbols, and
wherein the protocol framer module organizes the extracted subsets of contiguous bits into the plurality of in-phase/quadrature symbols such that each of the plurality of in-phase/quadrature symbols includes at least one symbol stuffing bit.

13. The configurable radio unit of claim 11, wherein each of the plurality of in-phase/quadrature symbols includes at least one data sample designated for a first communication channel and at least one data sample designated for a second communication channel.

14. The configurable radio unit of claim 11, wherein the protocol framer module is configured to, when a slipping between the communication scheme sample rate and the CPRI basic frame rate is detected, modify a size of the container frame by a size of at least one CPRI basic frame.

15. A method for transmitting signal data contained within a common public radio interface (CPRI) basic frame stream when employing a CPRI communication scheme whose sample rate is other than an integer multiple of a CPRI basic frame rate of the CPRI basic frame stream, the method comprising:
calculating a least common multiple of the CPRI communication scheme sample rate and the CPRI basic frame rate;
generating a container frame based on the calculated least common multiple;
extracting a subset of bits from continuous CPRI basic frames of the CPRI basic frame stream;
organizing the extracted subsets of bits into a plurality of in-phase/quadrature symbols within the container frame;
buffering the container frame for transmission;
detecting clock slipping based on a clock associated with the communication scheme and a clock associated with the CPRI basic frame stream; and
compensating for the clock slipping after the clock slipping has been detected, the compensating including increasing or decreasing a size of the container frame by a size of at least one CPRI basic frame.

16. The method of claim 15, wherein the organizing of the extracted subsets of bits into the plurality of in-phase/quadrature symbols includes placing at least one symbol stuffing bit into each in-phase/quadrature symbol, and
wherein the generating of the container frame includes placing a plurality of leading stuffing bits at the beginning of the container frame and a plurality of trailing stuffing bits at the end of the container frame that bookend the plurality of in-phase/quadrature symbols.

17. The method of claim 15, wherein the organizing of the extracted subsets of bits into the plurality of in-phase/quadrature symbols includes placing at least one data sample designated for a first communication channel and at least one data sample designated for a second communication channel in each of the plurality of in-phase/quadrature symbols.

18. The method of claim 15, wherein the detecting determines the clock slipping to be an overflow scenario when at least one of the communication scheme clock is running slower than expected and the CPRI clock is running faster than expected, or to be an underflow scenario when at least one of the communication scheme clock is running faster than expected and the CPRI clock is miming slower than expected.

19. The method of claim 18, wherein the compensating for the clock slipping includes increasing or decreasing the size of the container frame by size of at least one CPRI basic frame depending on whether an overflow scenario or an underflow scenario has been detected.

20. The configurable radio unit of claim 1, wherein the line rate, the frame length, the first subset of contiguous bits, and the second subset of contiguous bits are proprietary.

* * * * *

UNITED STATES PATENT AND TRADEMARK OFFICE
CERTIFICATE OF CORRECTION

| | |
|---|---|
| PATENT NO. | : 9,125,054 B2 |
| APPLICATION NO. | : 13/526237 |
| DATED | : September 1, 2015 |
| INVENTOR(S) | : Timothy Ryan |

It is certified that error appears in the above-identified patent and that said Letters Patent is hereby corrected as shown below:

Title page, page 2, item 56, Foreign Patent Documents, please delete duplicate reference "WO 2011/152131".

In The Specification
Column 7, line 8, please replace "in" with --In--.

In The Claims
Column 15, line 10, please replace "CPRI clock is miming" with --CPRI clock is running--.

Signed and Sealed this
First Day of March, 2016

Michelle K. Lee
*Director of the United States Patent and Trademark Office*